(12) United States Patent
Nakano

(10) Patent No.: US 12,315,173 B2
(45) Date of Patent: May 27, 2025

(54) IMAGE PROCESSING SYSTEM, IMAGE PROCESSING METHOD, AND STORAGE MEDIUM FOR ASSOCIATING MOVING OBJECTS IN IMAGES

(71) Applicant: TOYOTA JIDOSHA KABUSHIKI KAISHA, Toyota (JP)

(72) Inventor: Yusuke Nakano, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 354 days.

(21) Appl. No.: 17/850,665

(22) Filed: Jun. 27, 2022

(65) Prior Publication Data

US 2023/0005162 A1 Jan. 5, 2023

(30) Foreign Application Priority Data

Jul. 5, 2021 (JP) .................................. 2021-111258

(51) Int. Cl.
*G06T 7/246* (2017.01)
*G06T 7/579* (2017.01)
*G06T 7/73* (2017.01)
*G06T 7/90* (2017.01)

(52) U.S. Cl.
CPC .............. *G06T 7/248* (2017.01); *G06T 7/579* (2017.01); *G06T 7/74* (2017.01); *G06T 7/90* (2017.01); *G06T 2207/10016* (2013.01); *G06T 2207/30244* (2013.01); *G06T 2207/30248* (2013.01)

(58) Field of Classification Search
None
See application file for complete search history.

(56) References Cited

U.S. PATENT DOCUMENTS

2013/0016877 A1* 1/2013 Feris ...................... G06T 7/246
382/103
2013/0050502 A1 2/2013 Saito et al.

FOREIGN PATENT DOCUMENTS

| JP | H10-105690 A | 4/1998 |
| JP | 2002329207 A | * 11/2002 |
| JP | 2004199623 A | * 7/2004 |
| JP | 2012-059224 A | 3/2012 |
| JP | 2018-032078 A | 3/2018 |
| JP | 2019-101526 A | 6/2019 |
| JP | 2020-161032 A | 10/2020 |

OTHER PUBLICATIONS

English translation of JP2002329207A. (Year: 2002).*
English translation of JP2004199623A. (Year: 2004).*

* cited by examiner

*Primary Examiner* — Thomas D Lee
(74) *Attorney, Agent, or Firm* — Oliff PLC

(57) ABSTRACT

An image processing system includes an image acquisition unit that acquires a plurality of images including a moving object image, an image capturing direction data calculation unit that calculates image capturing direction data indicating an image capturing direction in which an imaging device captures an image of a moving object at a time when the images is captured, a feature amount calculation unit that calculates a feature amount of the moving object image extracted from the images, and an associating unit that associates the moving objects in the images with each other based on the image capturing direction data and the feature amount.

9 Claims, 10 Drawing Sheets

IMAGE PROCESSING SYSTEM, IMAGE PROCESSING METHOD, AND STORAGE MEDIUM FOR ASSOCIATING MOVING OBJECTS IN IMAGES

CROSS-REFERENCE TO RELATED APPLICATION

This application claims priority to Japanese Patent Application No. 2021-111258 filed on Jul. 5, 2021, incorporated herein by reference in its entirety.

BACKGROUND

1. Technical Field

The present disclosure relates to an image processing system, an image processing method, and a storage medium.

2. Description of Related Art

There is a well-known technique of capturing an image of a moving object such as a vehicle and tracking behaviors of each of moving objects over a relatively wide area. Related art Japanese Unexamined Patent Application Publication No. 10-105690 (JP 10-105690 A) discloses a disclosure for monitoring a vehicle within a monitored area using a plurality of behavior detection units. The behavior detection unit disclosed in JP 10-105690 A stores images of several vehicles detected from captured images, and ID numbers assigned to distinguish these vehicles. When the detected vehicle leaves a vehicle detection area, each behavior detection unit stores the information in a buffer. An adjacent behavior detection unit compares a captured image of each vehicle with the vehicle image stored in the buffer of the immediately preceding behavior detection unit, and assigns an ID number to the vehicle based on a comparison result. It is possible to track a vehicle by assigning the same ID number of the same vehicle.

SUMMARY

The behavior detection unit disclosed in JP 10-105690 A compares a plurality of captured images and assigns the ID number to the vehicle based on comparison results. However, in a case where the moving object such as a vehicle shows different posture or lighting in the monitored area, the same vehicle may be wrongfully recognized as a different vehicle.

The present disclosure provides an image processing system, an image processing method, and a storage medium, each of which is capable of accurately associating moving objects to be tracked in a plurality of images with each other.

An image processing system according to a first aspect of the present disclosure includes an image acquisition unit configured to acquire a plurality of images including a moving object image, an image capturing direction information calculation unit configured to calculate image capturing direction information indicating an image capturing direction in which an imaging device captures an image of a moving object at a time when the images is captured, a feature amount calculation unit configured to calculate a feature amount of the moving object image extracted from the images, and an associating unit configured to associate the moving objects in the images with each other based on the image capturing direction information and the feature amount.

In the first aspect, an image processing system includes an image acquisition unit configured to acquire a plurality of images including a moving object image, a feature amount calculation unit configured to calculate a feature amount of the moving object image extracted from the images, and a feature amount of another moving object image extracted from the same image as an image including the moving object image, and an associating unit configured to associate the moving objects in the images with each other, based on the feature amount of the moving object image and the feature amount of the other moving object image.

An image processing method according to a second aspect of the present disclosure includes acquiring a plurality of images including a moving object image, calculating image capturing direction information indicating an image capturing direction in which an imaging device captures an image of a moving object at a time when the images is captured, calculating a feature amount of the moving object image extracted from the images, and associating the moving objects in the images with each other based on the image capturing direction information and the feature amount.

An image processing method according to the second aspect includes acquiring a plurality of images including a moving object image, calculating a feature amount of the moving object image extracted from the images, and a feature amount of the other moving object image extracted from the same image as an image including the moving object image, and associating the moving objects in the images with each other, based on the feature amount of the moving object image and the feature amount of the other moving object image.

A non-transitory storage medium according to a third aspect of the present disclosure stores an image processing program to cause a computer to execute acquiring a plurality of images including a moving object image, calculating image capturing direction information indicating an image capturing direction in which an imaging device captures an image of a moving object at a time when the images is captured, calculating a feature amount of the moving object image extracted from the images, and associating the moving object in the images with each other based on the image capturing direction information and the feature amount.

In the third aspect, a non-transitory storage medium storing an image processing program causes a computer to execute acquiring a plurality of images including a moving object image, calculating a feature amount of the moving object image extracted from the images, and a feature amount of the other moving object image extracted from the same image as an image including the moving object image, and associating the moving objects in the images with each other, based on the feature amount of the moving object image and the feature amount of the other moving object image.

With each aspect of the present disclosure, the moving object is able to accurately associate the moving objects to be tracked in the images with each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An image processing system 100 according to the present embodiment will be described hereinbelow. The image processing system 100 is an information processing system that acquires a plurality of images including a moving object to be tracked and associates the moving objects in the images with each other. The moving object may include, for example, a vehicle, a person, an animal, or a robot. However the moving object is not limited thereto, and the present disclosure may be applied to various mobile objects that may be tracked.

In the present embodiment, a case where the moving object to be tracked is a vehicle 200 traveling on a road will be described as an example. The image processing system 100 acquires a plurality of images captured by a camera installed on the road. The image processing system 100 extracts an image of the vehicle 200 from the plurality of acquired images, and associates the vehicles 200 in the plurality of images with each other.

Figure 1:
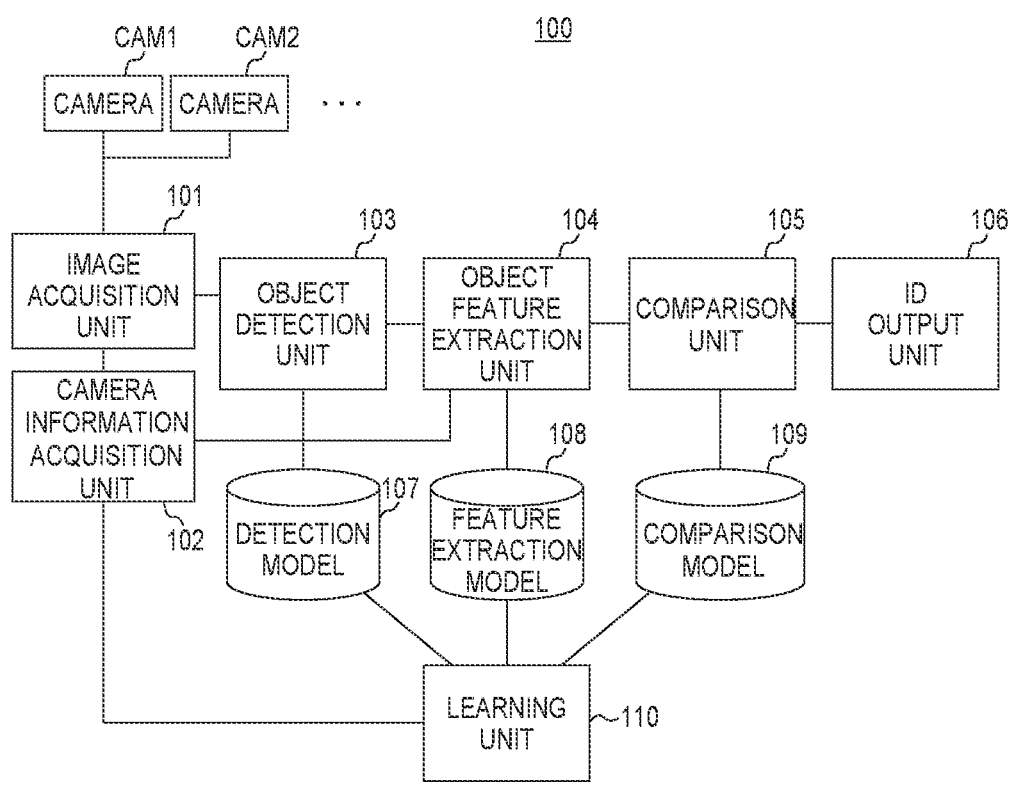
FIG. 1 is a block diagram illustrating a configuration of an image processing system according to a first embodiment.

Hereinafter, embodiments of the present disclosure will be described with reference to drawings. FIG. 1 is a block diagram illustrating a configuration of the image processing system 100 according to the present embodiment. The image processing system 100 includes a camera CAM1, a camera CAM2, an image acquisition unit 101, a camera information acquisition unit 102, an object detection unit 103, an object feature extraction unit 104, a comparison unit 105, an ID output unit 106, a detection model 107, a feature extraction model 108, a comparison model 109, and a learning unit 110.

The cameras CAM1 and CAM2 are imaging devices that capture images of the vehicle 200 to be tracked. The camera CAM1 or CAM2 may be collectively referred to simply as a "camera" hereinbelow. The camera is installed in an area where an image of the vehicle 200 can be captured. The camera may be, for example, an RGB camera, a monochrome camera, a grayscale camera, or an IR camera. However the camera is not limited thereto, and various cameras may be used. The number of cameras may be one or more. Two cameras will be adopted hereinbelow, but three or more cameras may be used. A combination of different types of cameras may also be employed. For example, the camera CAM1 may be an RGB camera and the camera CAM2 may be a monochrome camera.

The captured image obtained from the camera may be a still image or a moving image. The image capturing direction of the camera may or may not be fixed. For example, the camera may capture a 360-degree image, and may capture an image in a different direction at a predetermined time interval.

The camera is installed in an area where an image of the moving object to be tracked can be captured. In the present embodiment, since the vehicle 200 is tracked, it is assumed that the camera is installed on the road on which the vehicle 200 travels. The image processing system 100 and the plurality of cameras may be connected by a wired or wireless network. In FIG. 1, the cameras CAM1 and CAM2 are included in the image processing system 100, but they do not have to be mounted in the same device. For example, the cameras CAM1 and CAM2 may be installed on the road, and other functional units may be installed in a predetermined server.

The captured image may include a moving object other than the moving object to be monitored. For example, a moving object different from the moving object to be monitored may be included in the captured image. A moving object different from the moving object to be monitored may be referred to as "the other moving object" hereinbelow. The other moving object may be, for example, a vehicle traveling in the same traveling direction as the vehicle to be monitored. However, the other moving object is not limited thereto, and the other moving object may be a person, an animal, a robot, or the like.

The image acquisition unit 101 acquires several captured images including a moving object image to be tracked from the camera. The image acquisition unit 101 acquires a captured image including the vehicle 220 from the cameras CAM1 and CAM2. The image acquisition unit 101 may acquire a captured image each time the image is captured by the camera, or may acquire captured images at a predetermined time interval. The image acquisition unit 101 acquires time stamp information indicating a date and time when the image is captured together with the captured image.

The camera information acquisition unit 102 acquires camera parameters and outputs the acquired camera parameters to the object feature extraction unit 104.

The object detection unit 103 uses the detection model 107 to detect an area of an object included in the captured image acquired by the image acquisition unit 101.

The object feature extraction unit 104 functions as the image capturing direction information calculation unit and the feature amount calculation unit. The image capturing direction information calculation unit is a functional unit that calculates image capturing direction information indicating the image capturing direction in which the camera captures an image of a moving object when the image is captured. Further, the feature amount calculation unit is a functional unit that calculates a feature amount of the moving object image extracted from the plurality of images. Each function will be described hereinbelow. The detailed procedure of each process will be described later.

The object feature extraction unit 104 (image capturing direction information calculation unit) calculates image capturing direction information indicating the image capturing direction in which the camera captures the image of the moving object at a time when the plurality of captured images acquired by the image acquisition unit 101. The image capturing direction information can represent, for example, the image capturing direction in which each of the cameras CAM1 and CAM2 captures the image of the vehicle 200 using unit direction vectors $n_1$ and $n_2$. The object feature extraction unit 104 generates the unit direction vectors $n_1$ and $n_2$. Hereinbelow, an arrow on an alphabetic character indicating a vector may be omitted, and only a term may be used to indicate that it is a vector.

Although it is described here that both the unit direction vectors $n_1$ and $n_2$ are generated, it is not necessary to generate them at the same time. The unit direction vectors $n_1$ and $n_2$ may be generated at different times. For example, the unit direction vector $n_1$ or $n_2$ generated may be stored in a storage unit (not shown). The same applies to image vectors $i_1$ and $i_2$, integrated vectors $g_1$ and $g_2$, and feature vectors $f_1$ and $f_2$ described later.

Further, the object feature extraction unit 104 (feature amount calculation unit) calculates the feature amount of the moving object image detected by the object detection unit 103. In particular, the object feature extraction unit 104 calculates the feature amounts of the image of the vehicle 200, which is detected from the images captured by the cameras CAM1 and CAM2, by adding the unit direction vectors $n_1$ and $n_2$, respectively. The respective feature amount can be represented by feature vectors $f_1$ and $f_2$. The object feature extraction unit 104 generates the feature vectors $f_1$ and $f_2$ by executing the following process.

The object feature extraction unit 104 calculates image vectors $i_1$ and $i_2$ of the images captured by the cameras CAM1 and CAM2, respectively. The image vectors $i_1$ and $i_2$ may indicate a pixel value of each pixel in each image.

The object feature extraction unit 104 integrates the unit direction vector $n_1$ and the image vector $i_1$ to generate an integrated vector $g_1$. Similarly, the object feature extraction unit 104 integrates the unit direction vector $n_2$ and the image vector $i_2$ to generate an integrated vector $g_2$. The object feature extraction unit 104 uses the feature extraction model 108 to generate the feature vectors $f_1$ and $f_2$ from the integrated vectors $g_1$ and $g_2$, respectively.

As stated above, the object feature extraction unit 104 generates the feature vector $f_1$ indicating the feature amount of the vehicle 200 captured by the camera CAM1, and the feature vector $f_2$ indicating the feature amount of the vehicle 200 captured by the camera CAM2.

The object feature extraction unit 104 may calculate a feature amount of the other moving object image extracted from the same image as the image including the vehicle 200. For example, in a case where the vehicle 200 and a vehicle 210 different from the vehicle 200 are included in the same image, the object feature extraction unit 104 may calculate the feature amounts of the vehicle 200 and the vehicle 210, respectively, by the process stated above.

The comparison unit 105 and the ID output unit 106 function as an associating unit. The associating unit is a functional unit that associates the moving objects in the images with each other based on the image capturing direction information and the feature amount of the captured image. In particular, the comparison unit 105 compares the feature vectors $f_1$ and $f_2$ generated by the object feature extraction unit 104 using the comparison model 109. The ID output unit 106 assigns a moving object ID to the vehicle 200 included in the image based on the comparison result made by the comparison unit 105. The moving object ID is identification information for identifying the moving object included in the image. Consequently, it is possible to associate the vehicles 200 in the plurality of images with each other.

In the comparison stated above, the comparison unit 105 may associate the moving objects in the images in different ways according to whether the unit direction vectors $n_1$ and $n_2$ are similar to each other. Whether or not the unit direction vectors $n_1$ and $n_2$ are similar may be determined by comparison with a predetermined threshold provided in advance.

Further, the comparison unit 105 may compare the vehicle 200 using different references depending on whether the unit direction vectors $n_1$ and $n_2$ are similar to each other. For example, in a case where the unit direction vectors $n_1$ and $n_2$ are similar to each other, the comparison unit 105 may make a comparison using a reference including a shape of the vehicle 200, and in a case where the unit direction vectors $n_1$ and $n_2$ are not similar to each other, the comparison unit 105 may make a comparison using a reference not including the shape of the vehicle 200. In a case where the unit direction vectors $n_1$ and $n_2$ are not similar to each other, the comparison unit 105 may make a comparison using, for example, a reference including at least color information of the moving object.

The comparison unit 105 may compare the feature vectors $f_1$ and $f_2$ in a case where the unit direction vectors $n_1$ and $n_2$ are similar to each other, and may not make this comparison in a case where they are not similar to each other. Further, the comparison unit 105 may compare the feature vectors $f_1$ and $f_2$ based on the feature amount of an image other than the image of the vehicle 200.

The ID output unit 106 assigns the moving object ID to the extracted moving object image as a function of the comparison result made by the comparison unit 105. As a result of the comparison by the comparison unit 105, in a case where it is determined that the moving object is the same in the plurality of images, the ID output unit 106 assigns the same moving object ID to the moving object image.

The learning unit 110 trains the detection model 107, the feature extraction model 108, and the comparison model 109, respectively.

Figure 2:
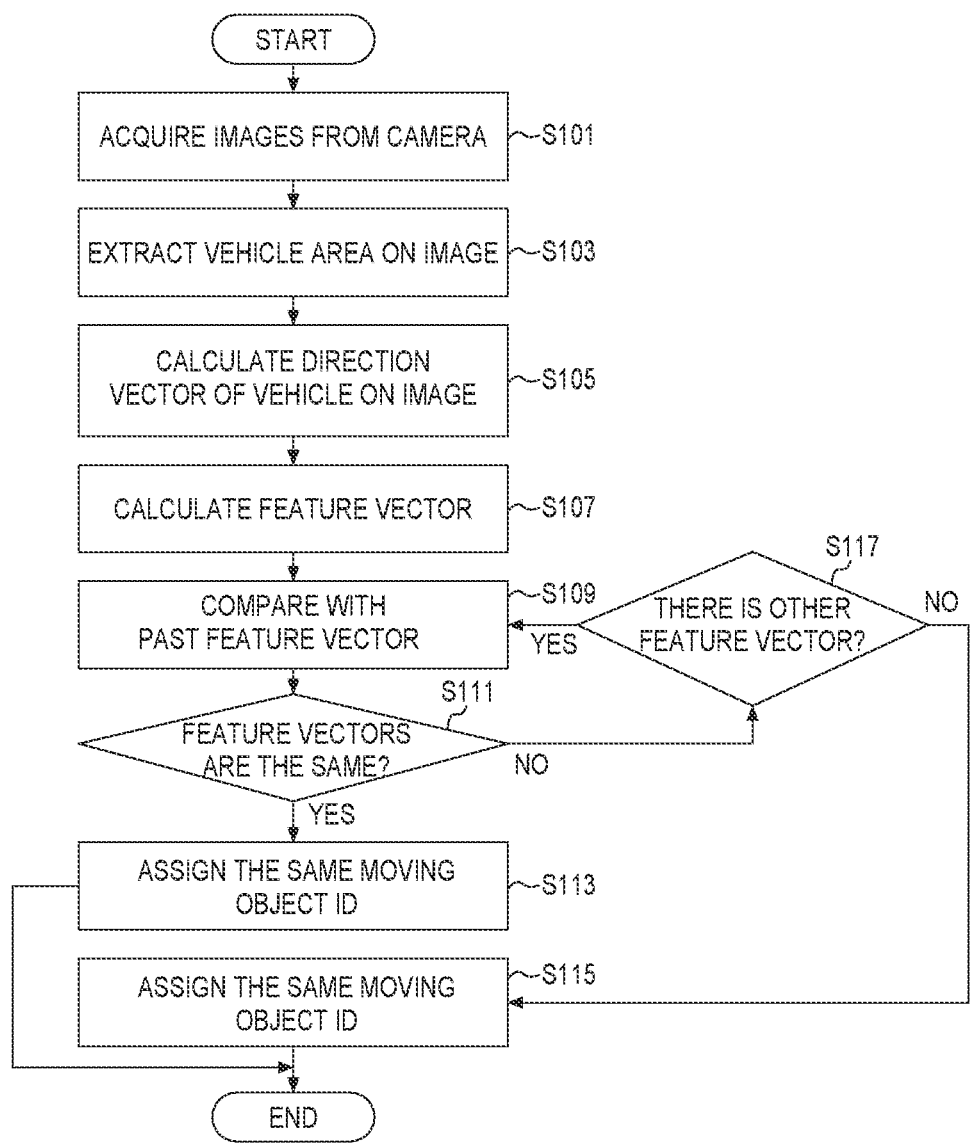
FIG. 2 is a flowchart illustrating a process of the image processing system according to the first embodiment.

A process executed by the image processing system 100 will be described with reference to FIG. 2. FIG. 2 is a flowchart illustrating a process of the image processing system 100.

The image acquisition unit 101 acquires a captured image from the camera (S101). The captured image includes the time stamp information indicating a date and time when the image is captured.

The object detection unit 103 uses the detection model 107 to execute processes of extracting and identifying the input image. The object detection unit 103 extracts a moving object area including a moving object such as a vehicle, a bicycle, or a pedestrian in the image. In the present embodiment, the object detection unit 103 extracts an image area of the vehicle 200 (S103). The object detection unit 103 may extract the moving object area using general object recognition technology based on a deep learning network.

The object feature extraction unit 104 calculates a direction vector of the vehicle from camera parameters acquired from the camera information acquisition unit 102 and the object area extracted in step S103 (S105).

The object feature extraction unit 104 generates an integrated vector obtained by integrating a feature of the object image extracted in step S103 and the direction vector calculated in step S105. The object feature extraction unit 104 takes the integrated vector generated as an input, and generates a feature vector using a feature extractor such as a neural network (S107).

The comparison unit 105 compares the feature vector of the target object with a feature vector of a past frame (S109). The comparison unit 105 determines whether the feature vector of the target object is equivalent to the feature vector of the past frame (S111). In a case where it is determined that the feature vectors are the same (YES in S111), the ID output unit 106 assigns the same ID (S113) and ends the process.

In a case where it is determined that the feature vectors are not the same in step S111 (NO in S111), the process proceeds to step S117. The comparison unit 105 determines whether there is the other feature vector (S117). In a case where it is determined that there is the other feature vector (YES in S117), the process returns to step S109. In a case where it is determined that there is no other feature vector (NO in S117), the process proceeds to step S115. In this case, the ID output unit 106 assigns a new ID (S115) and ends the process.

Figure 3:
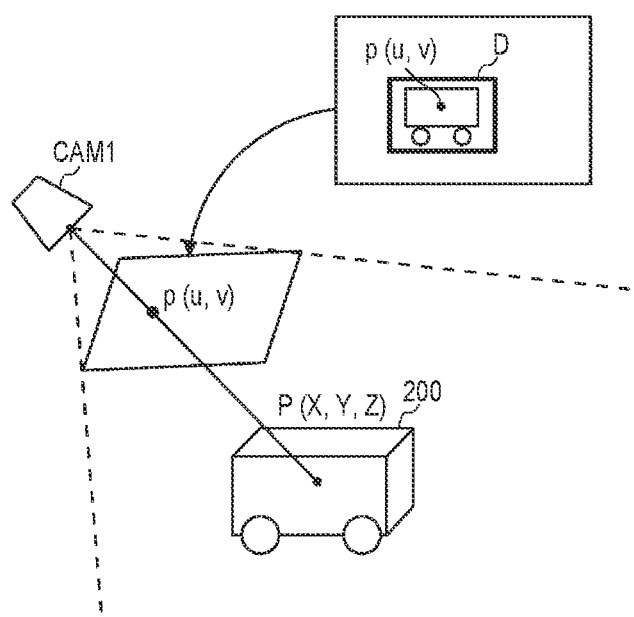
FIG. 3 is an explanatory diagram illustrating the image processing system according to the first embodiment.

The processes of steps S105, S107, and S109 mentioned above will be described in detail with reference to FIG. 3. FIG. 3 is a diagram illustrating an outline of the process until the unit direction vector $n_1$, the image vector $i_1$, the integrated vector $g_1$, and the feature vector $f_1$ are generated in a case where the image of the vehicle 200 is captured by the camera CAM1. The unit direction vector $n_2$, the image vector $i_2$, the integrated vector $g_2$, and the feature vector $f_2$ in a case where the image of the vehicle 200 is captured by the camera CAM2 can be generated in the same manner.

The image vector $i_1$ or $i_2$ may be collectively referred to as an "image vector i" hereinbelow. Similarly, the unit direction vector $n_1$ or $n_2$ may be collectively referred to as a "unit direction vector n", the integrated vector $g_1$ or $g_2$ may be collectively referred to as an "integrated vector g", and the feature vector $f_1$ or $f_2$ may be collectively referred to as a "feature vector f".

In step S105 stated above, the unit direction vector n of the vehicle 200 is calculated from the camera parameters and the object area extracted in step S103 by the following procedure. The camera parameters are represented as a projection matrix A having 3 rows and 4 columns. As shown in FIG. 3, a gravity center position of the vehicle in the 3D coordinate system is P(X, Y, Z), and a gravity center position in the image coordinate system is p(u, v).

A relationship between P(X, Y, Z) and p(u, v) is represented by the following equation (1).

$$S \begin{pmatrix} u \\ v \\ 1 \end{pmatrix} = A \begin{pmatrix} X \\ Y \\ Z \\ 1 \end{pmatrix} \quad (1)$$

In equation (1), S represents a scale parameter. The projection matrix A is a known matrix obtained by calibrating the camera CAM1. Further, the projection matrix A can be represented by the following equations (2) and (3).

$$A = \begin{pmatrix} \vec{a}_1 b_1 \\ \vec{a}_2 b_2 \\ \vec{a}_3 b_3 \end{pmatrix} = (\tilde{A}|b) \quad (2)$$

$$\vec{a}_i = (a_{i1}, a_{i2}, a_{i3}) \quad (3)$$

The following equation (4) can be obtained from equations (1) to (3).

$$\begin{pmatrix} X \\ Y \\ Z \end{pmatrix} = -\tilde{A}^{-1} b + s\tilde{A}^{-1} \begin{pmatrix} u \\ v \\ 1 \end{pmatrix} \quad (4)$$

In step S105, the unit direction vector n of the vehicle 200 is calculated by the following equation (5).

$$\vec{n} = \frac{\vec{N}}{\|\vec{N}\|} \quad (5)$$

In equation (5), a direction vector N is represented by the following equation (6).

$$\vec{N} = \tilde{A}^{-1} \begin{pmatrix} u \\ v \\ 1 \end{pmatrix} \quad (6)$$

In step S107, the feature vector f is calculated by the following procedure. A detection frame D of the vehicle 200 shown in FIG. 3 is normalized to a rectangular area of K*K. The detection frame D may be the image area detected by the object detection unit 103. A raster scan is performed on the normalized rectangular area. Pixel values of the rectangular area are arranged in order of the raster scan and defined as the image vector i as shown in the following equation (7). The number of dimensions is equal to the number of pixels in the normalized rectangular area.

$$\vec{i} = \begin{pmatrix} i_1 \\ i_2 \\ \vdots \\ i_{k^2} \end{pmatrix} \quad (7)$$

The unit direction vector n calculated in equation (5) of step S105 and the image vector i defined in equation (7) are integrated to generate the integrated vector g represented by the following equation (8).

$$\vec{g} = \begin{pmatrix} \vec{n} \\ \vec{i} \end{pmatrix} = \begin{pmatrix} n_1 \\ n_2 \\ n_3 \\ i_1 \\ i_2 \\ \vdots \\ i_{k^2} \end{pmatrix} \quad (8)$$

Figure 4:
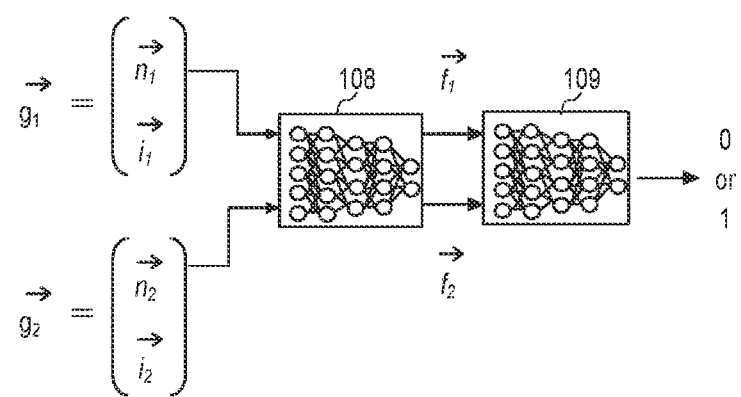
FIG. 4 is an explanatory diagram illustrating the image processing system according to the first embodiment.

The integrated vector g generated by equation (8) is input to a learner of the feature extraction model 108, and the feature vector f is obtained as an output. FIG. 4 shows one example of structures of the feature extraction model 108 and the comparison model 109. The integrated vector $g_2$ of the target object and the integrated vector $g_1$ of the past frame are shown in FIG. 4.

Various machine learning models can be used as the learner. For example, a convolutional neural network (CNN) may be used.

In step S109, the feature vector $f_2$ of the target object obtained in step S107 is compared with the feature vector $f_1$ of the past frame. The comparison unit 105 inputs the feature vectors $f_1$ and $f_2$ to a learner of the comparison model 109, and determines that they are the same if an output is 1 and that they are different if it is 0. Various machine learning models can be used as the learner. For example, a hierarchical neural network may be used.

Various general-purpose CNNs can be used as the feature extraction model 108. For example, VGG, EfficientNet or ResNet can be used. Further, a general-purpose fully-connected multi-layer perceptron can be used as the comparison model 109. The feature extraction model 108 and the comparison model 109 are trained at the same time.

The teacher data is a set of data represented by the equation (9) and a label represented by equation (10).

$$\{\vec{g}_t; l_t\}_{t=1,\ldots,T} \qquad (9)$$

$$l_t = id_t(t=1,\ldots,T) \qquad (10)$$

The integrated vector g is already defined in equation (8). "$id_t$" is a moving object ID of the moving object at a time t in equation (10). When inputting the integrated vectors $g_1$ and $g_2$, it is learned that 1 is input when the moving object IDs are the same and 0 is input when they are different.

As described above, the unit direction vector n from the camera can be added to the image vector i of the moving object image to generate the feature vector f to be used for image comparison in the present embodiment. Consequently, it is possible to associate the moving objects in the images with each other with higher accuracy than when comparing based on the image vector i only.

Figure 5:
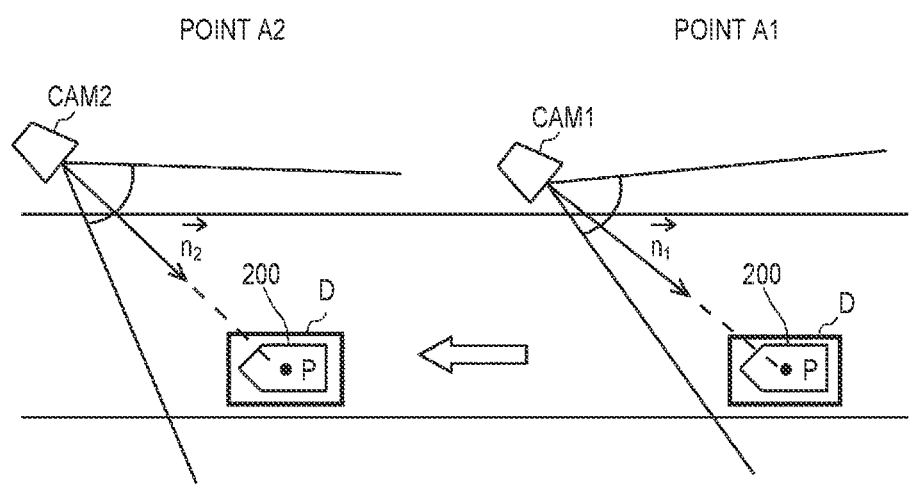
FIG. 5 is an explanatory diagram illustrating a case where image capturing directions are similar in the image processing system according to the first embodiment.
Figure 6:
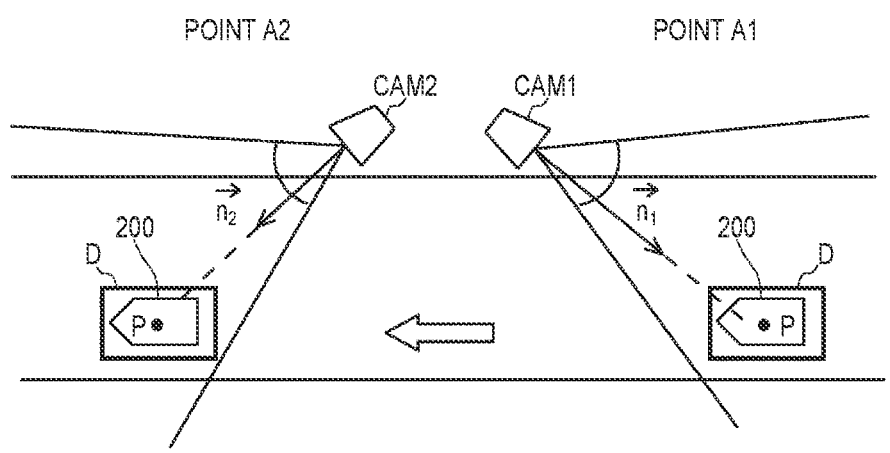
FIG. 6 is an explanatory diagram illustrating a case where image capturing directions are not similar in the image processing system according to the first embodiment.

FIGS. 5 and 6 are block diagrams respectively illustrating the process of the image processing system 100 according to the present embodiment. As shown by a white arrow, the vehicle 200 is traveling from a point A1 on the right side of the diagram to a point A2 on the left side of the diagram. The image of the vehicle 200 is captured by the camera CAM1 and the camera CAM2 at the points A1 and A2, respectively.

In FIG. 5, the cameras CAM1 and CAM2 are arranged so as to capture the vehicle 200 from the same direction. In FIG. 5, the cameras CAM1 and CAM2 capture images of the vehicle 200 from the front. On the other hand, the cameras CAM1 and CAM2 are arranged such that they face opposite directions in FIG. 6. The camera CAM1 captures an image of the vehicle 200 from the front, and the camera CAM2 captures an image of the vehicle 200 from the rear. Consequently, the vehicle 200 is shown as having different shapes in the images captured at the points A1 and A2.

In the image processing system 100 according to the present embodiment, the images may be compared with different references in a case shown in FIG. 5 and in a case shown in FIG. 6, thereby associating the vehicle 200. For example, in a case shown in FIG. 5, associating is carried out using a reference including a shape of the vehicle 200. The reference including the shape of the vehicle 200 may be a reference using features such as the shape and texture (pixel value of each pixel) of the vehicle 200.

In a case shown in FIG. 6, associating may be carried out using a reference not including a shape of the vehicle 200. The reference that does not include the shape of the vehicle 200 may be a reference that uses, for example, color characteristics of the vehicle 200. For example, it may be a reference using features such as overall color of the vehicle 200 (e.g. white) and a pattern of the vehicle 200. It is possible to accurately associate the vehicles 200 in the images with each other by making a comparison using such a feature that does not rely on a posture of the camera.

Further, in a case where the image capturing directions are significantly different as in the cameras CAM1 and CAM2 shown in FIG. 6, the captured image of the camera CAM2 may not be used for image associating. Accordingly, it is possible to compare only images having similar image capturing directions, and thus to associate the image with the weighted features related to the shape of the vehicle 200.

FIGS. 5 and 6 show an example in which the two cameras capture an image of the vehicle 200 from the same direction (front) and an example in which two cameras capture an image of the vehicle 200 from opposite directions (front and rear), but the present disclosure is not limited thereto. The image capturing direction may be any direction. For example, an image capturing direction of an image captured from a side surface or an upper surface of the vehicle 200 may be included. Therefore, the image capturing directions may differ by 90 degrees. Associating may be carried out differently depending on whether the image capturing directions are similar to each other. Whether the image capturing directions are similar to each other may be determined by comparing the unit direction vectors $n_1$ and $n_2$ when the camera captures an image of the vehicle 200 with a predetermined threshold.

Further, without being limited thereto, the image processing system 100 may optionally weight and associate the vehicles 200 in the images with each other.

As described above, the image acquisition unit 101 acquires the plurality of images including the vehicle 200 from the camera in the image processing system 100 according to the present embodiment. The object feature extraction unit 104 calculates the image capturing direction information (unit direction vector n) indicating the image capturing direction in which the camera captures the image of the moving object image, and the feature amount (image vector i) of each moving object image extracted from the plurality of images. The object feature extraction unit 104 calculates the integrated vector g from the unit direction vector n and the image vector i, and then calculates the feature vector f from the integrated vector g. The comparison unit 105 compares the feature vector f in the images captured at different times. The ID output unit 106 associates the moving objects in the images with each other by assigning the same moving object ID to the same vehicle 200 based on the comparison result made by the comparison unit 105.

With such a configuration, the image processing system 100 can associate based on, for example, color information that does not rely on the posture of the camera when it is determined that the unit direction vectors n are different from each other, i.e., the captured images show different shape characteristics of the vehicle 200. Therefore, with the image processing system 100 of the present embodiment, it is possible to learn an optimum ID inference engine in response to an arrangement of the camera. This prevents erroneous recognition of the captured moving object and enables accurate tracking of the moving object.

Second Embodiment

A second embodiment of the present disclosure will be described hereinbelow. In the first embodiment, the moving object is associate the moving objects in the images with each other based on the image capturing direction information (direction vector) calculated by the object feature extraction unit 104 (image capturing direction information calculation unit) and the feature amount (image vector) of each captured image. In the present embodiment, associating is carried out by adding information of the other moving object different from the vehicle 200, which is extracted in the captured image, instead of the direction vector.

Figure 7:
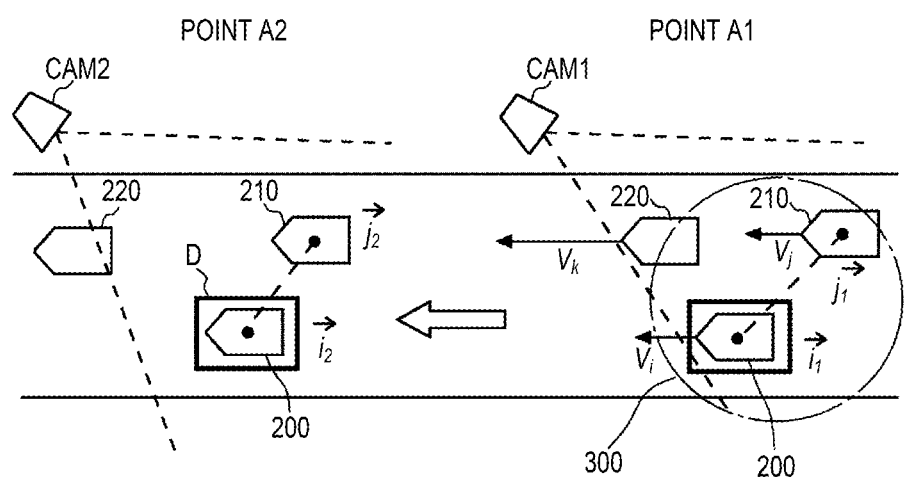
FIG. 7 is an explanatory diagram illustrating an image processing system according to a second embodiment.

FIG. 7 is a block diagram respectively illustrating the process of the image processing system 100 according to the present embodiment. As shown in FIG. 7, it is assumed that vehicles 210 and 220 exist in the vicinity of the vehicle 200 at the point A1, and that the vehicles 210, 220, 200 are traveling in the same direction. It is also assumed that a target for associating in the images is the vehicle 200, not the vehicles 210 and 220.

A configuration of the image processing system 100 according to the present embodiment is the same as that shown in the block diagram of FIG. 1. The configuration of the image processing system 100 according to the present embodiment will be described referring to FIG. 1. Descriptions of the same configuration as that of the first embodiment will be omitted.

The image acquisition unit 101 acquires several captured images including a moving object image from the camera. The captured image includes a moving object other than the vehicle 200. As shown in FIG. 7, it is assumed that the vehicles 200, 210, and 220 are included in the same image from among those captured by the camera CAM1. It is assumed that the vehicle 200 and 210 are included in the same image, but not the vehicle 220, from among those captured by the camera CAM2.

The object detection unit 103 uses the detection model 107 to detect object areas of the vehicles 200 to 220 from the image acquired by the image acquisition unit 101.

The object feature extraction unit 104 functions as the feature amount calculation unit. The object feature extraction unit 104 calculates the feature amount of each image for the vehicles 200 to 220 extracted by the object detection unit 103. Similar to the first embodiment, the object feature extraction unit 104 generates the image vector i indicating the feature amount of each image.

The object feature extraction unit 104 may specify a vehicle having a moving speed similar to that of the vehicle 200 to be associated with, from among the vehicles 210 and 220 which are not to be associated with, and calculate the image vector i. The moving speeds of the vehicles 200 to 220 may be calculated based on the plurality of images captured and acquired by the camera CAM1. For example, the plurality of images captured by the camera CAM 1 at predetermined time intervals may be compared and then the moving speed may be calculated based on intervals for capturing images and respective moving distances of the vehicles 200 to 220. Not limited thereto, the speed of each vehicle may be calculated using another algorithm.

In FIG. 7, the traveling speeds of the vehicles 200, 210, and 220 at the point A1 are indicated by a speed vector $V_i$, a speed vector $V_j$, and a speed vector $V_K$, respectively. It is assumed that the vehicle 200 and the vehicle 210 are traveling at relatively similar speeds, and the vehicle 220 is traveling at a speed relatively higher than those speeds. The object feature extraction unit 104 generates the image vector i of the image corresponding to the vehicle 210 which has a moving speed similar to that of the vehicle 200.

The object feature extraction unit 104 may set a predetermined threshold in advance and determine whether the moving speeds of the vehicles are similar to each other. The object feature extraction unit 104 may determine that the moving speeds of the vehicles are similar to each other, in a case where a difference between the moving speed of the vehicle 200 and the moving speed of the other vehicle is equal to or less than a predetermined value. A vehicle having a moving speed similar to that of the vehicle 200 may be referred to as a "nearby vehicle" for convenience of description hereinbelow.

There may be a plurality of nearby vehicles. In addition, a priority may be set for the plurality of nearby vehicles and used for associating the vehicles 200 in the images with each other. For example, the priority may increase as the moving speed of nearby vehicles becomes more similar to the moving speed of the vehicle 200, and the associating may be weighted based on the priority.

The description will be continued returning to FIG. 1. The comparison unit 105 and the ID output unit 106 have functions of the associating unit. The associating unit associates the vehicles 200 in the images with each other based on the feature amount of the image including the vehicle 200 and the feature amount of the images other than the vehicle 200.

In particular, the comparison unit 105 compares the plurality of images by comparing the feature vectors of the vehicle 200 generated by the object feature extraction unit 104. The comparison unit 105 may acquire the comparison result by using the comparison model 109. The ID output unit 106 assigns the moving object ID according to the comparison result made by the comparison unit 105.

Figure 8:
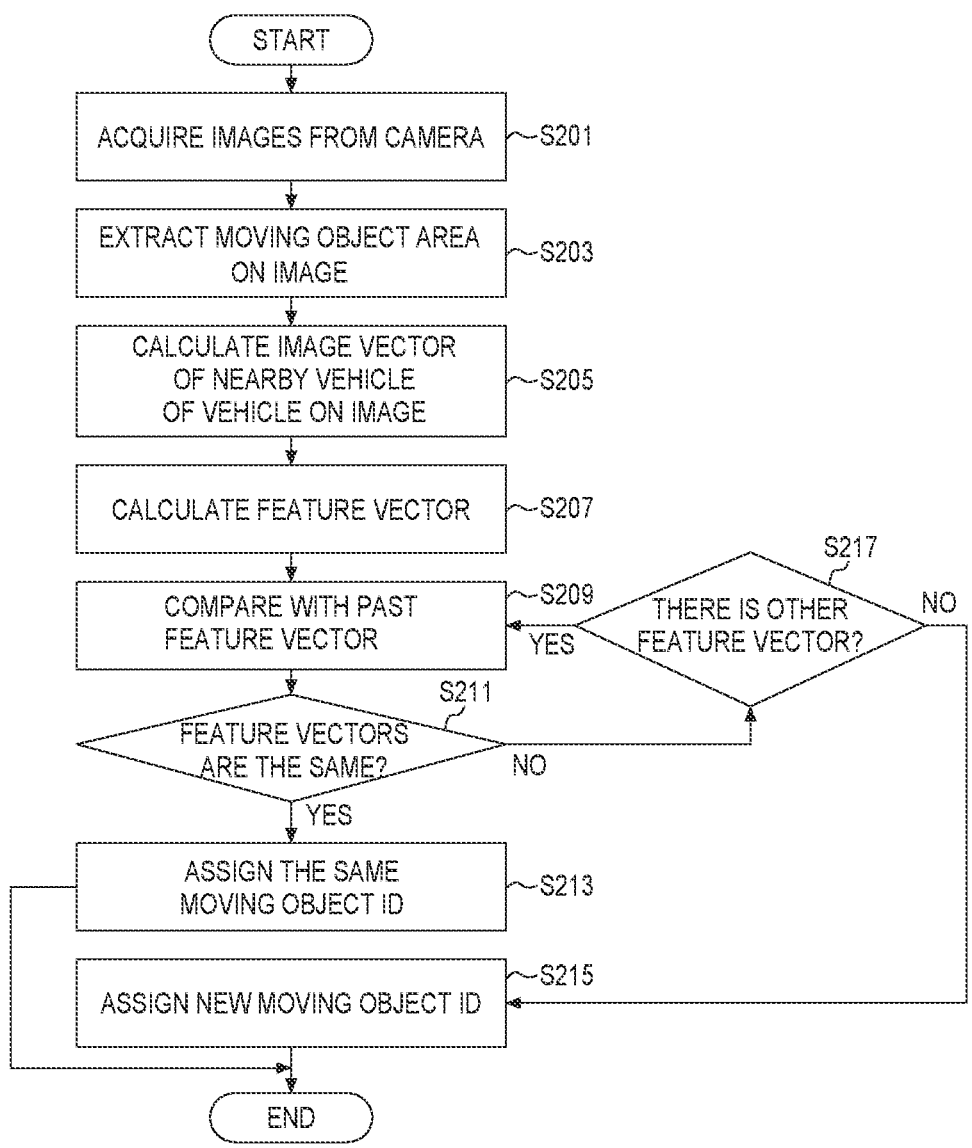
FIG. 8 is a flowchart illustrating a process of the image processing system according to the second embodiment.

A process executed by the image processing system 100 of the present embodiment will be described with reference to FIG. 8. FIG. 8 is a flowchart illustrating the process executed by the image processing system 100 according to the present embodiment.

The image acquisition unit 101 acquires a captured image from the camera (S201). The captured image includes the time stamp information indicating a date and time when the image is captured. The object detection unit 103 uses the detection model 107 to extract and identify the input image, and extracts a moving object area including a moving object such as a vehicle, a bicycle, or a pedestrian in the image (S203). The object detection unit 103 may extract the moving object area using general object recognition technology based on a deep learning network.

Figure 9:
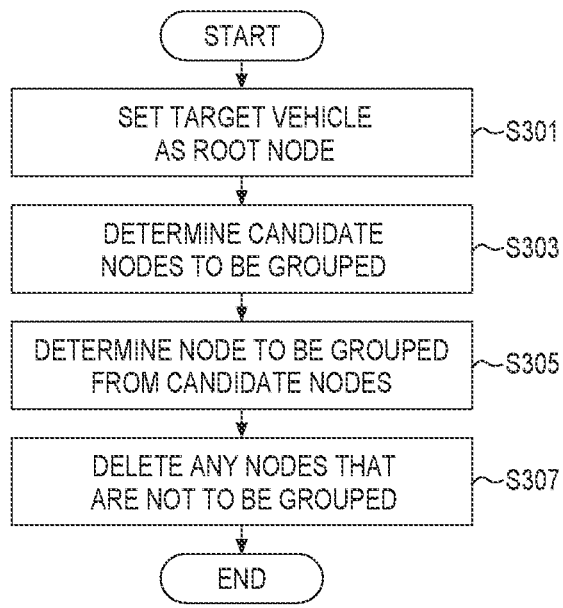
FIG. 9 is a flowchart illustrating a process of identifying a nearby vehicle in the image processing system according to the second embodiment.

The object feature extraction unit 104 calculates an image vector of the nearby vehicle in the captured image (S205). A process for identifying the nearby vehicle will be described hereinbelow with reference to FIG. 9. FIG. 9 is a flowchart illustrating the process for identifying the nearby vehicle.

The object feature extraction unit 104 adds a vehicle having a moving speed similar to that of the vehicle 200 (hereinafter referred to as a "node") to the same grouping circle 300, and deletes a node having a moving speed not similar to that of the vehicle 200 from the grouping circle 300. The object feature extraction unit 104 adds or deletes nodes by the following process.

The object feature extraction unit 104 determines the vehicle 200 to associate the vehicles 200 in the images with each other as a root node (S301). The object feature extraction unit 104 determines a candidate node to be grouped with the vehicle 200 (S303). For example, the object feature extraction unit 104 sets a vehicle within a predetermined distance from a center of gravity of an orthorectified image of the target vehicle as a candidate node. In the example shown in FIG. 7, the vehicles 210 and 220 are candidate nodes. Not limited thereto, the candidate node may be determined using any condition. For example, all moving objects in the captured image may be used as candidate nodes.

From among the candidate nodes, the object feature extraction unit 104 determines, as a node in the same grouping circle 300 as the vehicle 200, a vehicle in which an absolute value of the difference between its speed vector and the speed vector of the vehicle 200 is equal or less than a predetermined value (S305). Edge strength is a reciprocal of the absolute value of the difference. The object feature extraction unit 104 determines the vehicle 210 as the node of the same grouping circle 300 as the vehicle 200.

The object feature extraction unit 104 deletes any candidate nodes not satisfying the condition stated in step S305 (S307). The vehicle 220 is deleted in the present embodiment.

Consequently, the object feature extraction unit 104 can identify a nearby vehicle that belongs to the same group as the vehicle 200. In the present embodiment, the object feature extraction unit 104 identifies the vehicle 210 as a vehicle that is nearby the vehicle 200.

The description will be continued returning to FIG. 8. The object feature extraction unit 104 generates the feature vector using the image vectors of the vehicles 200 and 210 (S207). Since a method of generating each feature vector is the same as that of the first embodiment, detailed descriptions thereof will be omitted.

Figure 10:
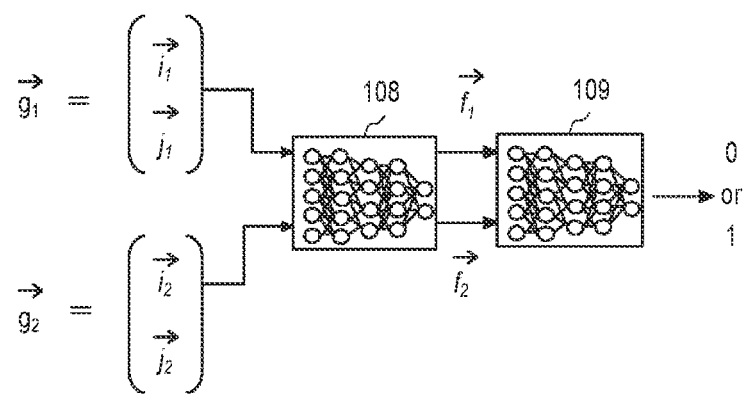
FIG. 10 is an explanatory diagram illustrating an image processing system according to the second embodiment.

FIG. 10 is a diagram corresponding to FIG. 4 of the first embodiment, and shows one example of the structure of the feature extraction model 108 and the comparison model 109. The object feature extraction unit 104 generates an image vector i of the vehicle 200 and an image vector j of the vehicle 210, respectively, in the same manner as in equation (7) in the first embodiment.

The object feature extraction unit 104 integrates the image vectors i and j to generate the integrated vector g in the same manner as in equation (8) of the first embodiment. The integrated vector g is represented by the following equation (11).

$$\vec{g} = \begin{pmatrix} \vec{i} \\ \vec{j} \end{pmatrix} = \begin{pmatrix} i_1 \\ i_2 \\ \vdots \\ i_{k2} \\ j_1 \\ j_2 \\ \vdots \\ j_{k2} \end{pmatrix} \quad (11)$$

The object feature extraction unit 104 generates the feature vector f from the integrated vector g in the same manner as in the first embodiment. The object feature extraction unit 104 generates the feature vector $f_2$ of the target object and the feature vector $f_1$ of the past frame, respectively.

The comparison unit 105 compares the feature vectors $f_1$ and $f_2$ obtained in step S207 (S209). When inputting the feature vectors $f_1$ and $f_2$, it is learned that 1 is input when the moving object IDs are the same and 0 is input when they are different.

Since the subsequent processes are the same as those of the first embodiment, descriptions thereof will be omitted. The processes of steps S211 to S217 correspond to steps S111 to S117 described with reference to FIG. 2, respectively.

In a case where there is a plurality of nearby vehicles, the feature vectors may be generated for all the nearby vehicles, or alternatively, the feature vectors may be generated for a limited number of nearby vehicles used for associating. For example, a priority order used for associating may be set depending on the moving speed of the vehicle 200, a positional relationship with the vehicle 200, and the like.

As stated above, in the image processing system 100 of the present embodiment, the feature vector is generated by adding image information of the vehicle 210 existing in the vicinity of the vehicle 200 to associate the vehicles 200 in the images with each other. Further, the nearby vehicle is specified by using the distance from the vehicle 200, and the difference between the moving speeds of the vehicle 200 and the vehicle 210.

Consequently, it is possible to associate the vehicles 200 in the images with each other more accurately by adding the image information of the moving object in the vicinity of the vehicle 200, which can be considered as belonging to the same group as the vehicle 200, to generate the feature, as compared to a case of using image information of the vehicle 200 only. Even in a case where there is the plurality of vehicles having shape characteristics similar to the vehicle 200, it is possible to appropriately associate the vehicle 200 with the vehicles 200 in the plurality of images.

The present embodiment may be implemented by combining the configurations described in the first embodiment. The vehicle 200 may be associate the vehicles in the images with each other by using both the direction vector described in the first embodiment and the image vector of the nearby vehicle described in the present embodiment.

Configuration Example of Hardware

Each functional component of the image processing system 100 may be implemented by hardware that implements each functional component (e.g. hard-wired electronic circuit), or by a combination of hardware and software (e.g. a combination of an electronic circuit and a program that controls the circuit). Hereinafter, a case where each functional component of the image processing system 100 is implemented by a combination of hardware and software will be further described.

Figure 11:
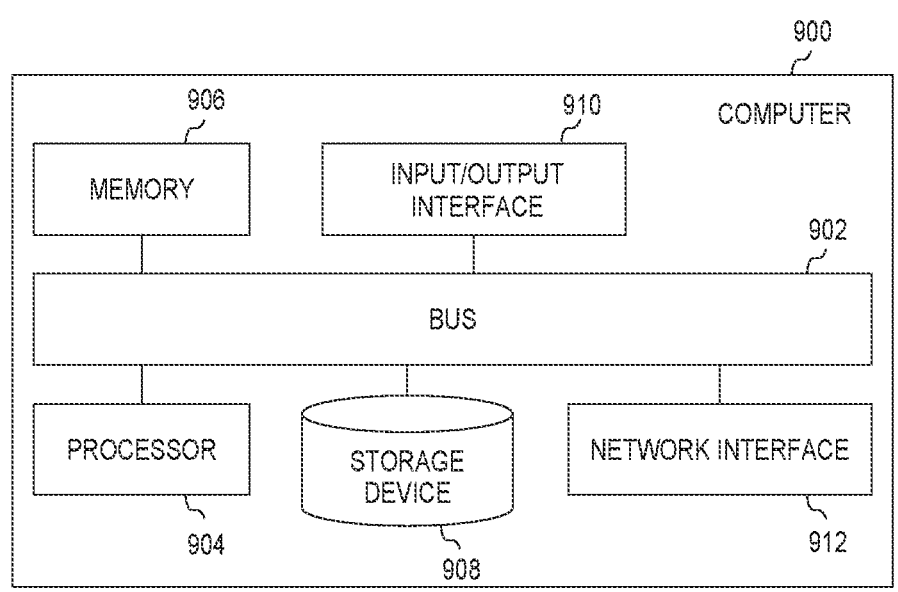
FIG. 11 is a diagram illustrating a configuration example of hardware.

FIG. 11 is a block diagram illustrating a hardware configuration of a computer 900 that implements the image processing system 100. The computer 900 may be a dedicated computer designed to implement the image processing system 100, or may be a general-purpose computer. The computer 900 may be a portable computer such as a smartphone or a tablet terminal.

For example, each function of the image processing system 100 is implemented on the computer 900 by installing a predetermined application on the computer 900. The application is composed of a program for implementing the functional components of the image processing system 100.

The computer 900 has a bus 902, a processor 904, a memory 906, a storage device 908, an input/output interface 910, and a network interface 912. The bus 902 is a data transmission line for the processor 904, the memory 906, the storage device 908, the input/output interface 910, and the network interface 912 to transmit and receive data to and from each other. However, a method of connecting the processor 904 and other components to each other is not limited to the bus connection.

The processor 904 may be one of various processors such as a central processing unit (CPU), a graphics processing unit (GPU), or a field-programmable gate array (FPGA). The memory 906 is a main storage device implemented by using, for example, a random access memory (RAM). The storage device 908 is an auxiliary storage device implemented by using, for example, a hard disk, a solid state drive (SSD), a memory card, or a read only memory (ROM).

The input/output interface 910 is an interface for connecting the computer 900 and the input/output device. For example, an input device such as a keyboard and an output device such as a display device are connected to the input/output interface 910. For example, the camera described in the embodiments may be connected to the input/output interface 910.

The network interface 912 is an interface for connecting the computer 900 to a network. This network may be a LAN (Local Area Network) or a WAN (Wide Area Network).

The storage device 908 stores a program (program that implements the applications stated above) to implement each functional component of the image processing system 100. The processor 904 reads this program into the memory 906 and executes such that each functional component of the image processing system 100 is implemented.

Each of the processors executes one or more programs containing instructions for causing the computer to perform the algorithm. The program includes instructions (or software code) for causing the computer to perform at least one function described in the embodiments when loaded into the computer. The program may be stored on a computer-readable non-transitory medium or a tangible storage medium. Non-limiting examples of computer-readable or tangible storage media include random-access memory (RAM), read-only memory (ROM), flash memory, solid-state drive (SSD) or other memories, CD-ROM, digital versatile disc (DVD), Blu-ray® disc or other optical disc storages, magnetic cassette, magnetic tape, magnetic disk storage or other magnetic storage devices. The program may be transmitted on a computer-readable transitory medium or a communication medium. Non-limiting examples of transitory or communication media include electrical, optical, acoustic, or other forms of propagating signals.

The present disclosure is not limited to the embodiments stated above, and may be altered as appropriate without departing from the spirit of the present disclosure.

What is claimed is:

1. An image processing system comprising
a processor and
a memory storing moving object identification information, and instructions that are executable by the processor that cause the processor to:
   acquire a plurality of images including a moving object image;
   calculate a direction vector indicating an image capturing direction in which an imaging device captures an image of a moving object at a time when the images is captured;
   calculate a feature amount of the moving object image extracted from the plurality of images;
   associate a plurality of the moving objects in the images with each other based on the direction vector and the feature amount; and
   associate the moving objects in the images with each other in different ways according to whether directions of a plurality of the direction vectors in the images are similar;
   compare the moving object and the moving object identification information based on the direction vector and the feature amount in a case where the directions of the direction vectors in the images are similar; and
   give a moving object identification to the moving object in a case where moving object identification corresponding to the moving object is included in the moving object identification information.

2. The image processing system according to claim 1, wherein the processor is configured to associate the moving objects in the images with each other using different references whether the directions of the direction vectors in the images are similar.

3. The image processing system according to claim 1, wherein the processor is configured to:

associate the moving objects in the images with each other using a reference including a shape of the moving object in a case where the directions of the direction vectors in the images are similar; and
associate the moving objects in the images with each other using a reference not including the shape of the moving object in a case where the directions of the direction vectors in the images are not similar.

4. The image processing system according to claim 1, wherein the processor is configured to associate the moving objects in the images with each other using a reference at least including color information of the moving object in a case where the directions of the direction vectors in the images are not similar.

5. An image processing system comprising
a processor and
a memory storing moving object identification information, and instructions that are executable by the processor that cause the processor to:
   acquire a plurality of images including a moving object image;
   calculate a feature amount of the moving object image extracted from the images, and
   calculate another feature amount of another moving object image extracted from the same image as an image including the moving object image in a case where a difference between a moving speed of a moving object in the moving object image and another moving speed of another moving object in the other moving object image is equal to or less than a predetermined value;
   associate the moving object and the other moving object in the images with each other, based on the feature amount of the moving object image and the other feature amount of the other moving object image;
   compare the moving object and the moving object identification information in a case where the feature amount of the moving object image and the other feature amount are the same; and
   give a moving object identification to the moving object in a case where moving object identification corresponding to the moving object is included in the moving object identification information.

6. An image processing method comprising:
acquiring a plurality of images including a moving object image;
calculating a direction vector indicating an image capturing direction in which an imaging device captures an image of a moving object at a time when the images is captured;
calculating a feature amount of the moving object image extracted from the images;
associating a plurality of the moving objects in the images with each other based on the direction vector and the feature amount;
associating the moving objects in the images with each other in different ways according to whether directions of a plurality of the direction vectors in the images are similar;
comparing the moving object and moving object identification information based on the direction vector and the feature amount in a case where the directions of the direction vectors in the images are similar; and
giving a moving object identification to the moving object in a case where moving object identification corresponding to the moving object is included in the moving object identification information.

7. An image processing method comprising:
acquiring a plurality of images including a moving object image;
calculating a feature amount of the moving object image extracted from the images;
calculating another feature amount of another moving object image extracted from the same image as an image including the moving object image in a case where a difference between a moving speed of a moving object in the moving object image and another moving speed of another moving object in the other moving object image is equal to or less than a predetermined value;
associating the moving object and the other moving object in the images with each other, based on the feature amount of the moving object image and the other feature amount of the other moving object image; and
comparing the moving object and moving object identification information in a case where the feature amount of the moving object image and the other feature amount are the same; and
giving a moving object identification to the moving object in a case where moving object identification corresponding to the moving object is included in the moving object identification information.

8. A non-transitory storage medium storing an image processing program causing a computer to execute:
acquiring a plurality of images including a moving object image;
calculating a direction vector indicating an image capturing direction in which an imaging device captures an image of a moving object at a time when the images is captured;
calculating a feature amount of the moving object image extracted from the images;
associating a plurality of the moving objects in the images with each other based on the direction vector and the feature amount;
associating the moving objects in the images with each other in different ways according to whether directions of a plurality of the direction vectors in the images are similar;
comparing the moving object and moving object identification information based on the direction vector and the feature amount in a case where the directions of the direction vectors in the images are similar; and
giving a moving object identification to the moving object in a case where moving object identification corresponding to the moving object is included in the moving object identification information.

9. A non-transitory storage medium storing an image processing program causing a computer to execute:
acquiring a plurality of images including a moving object image;
calculating a feature amount of the moving object image extracted from the images;
calculating anothera feature amount of another moving object image extracted from the same image as an image including the moving object image in a case where a difference between a moving speed of a moving object in the moving object image and another moving speed of another moving object in the other moving object image is equal to or less than a predetermined value;
associating the moving object and the other moving object in the images with each other, based on the feature amount of the moving object image and the other feature amount of the other moving object image; and
comparing the moving object and moving object identification information in a case where the feature amount of the moving object image and the other feature amount are the same; and
giving a moving object identification to the moving object in a case where moving object identification corresponding to the moving object is included in the moving object identification information.

* * * * *